US005927316A

United States Patent [19]

Merrill

[11] Patent Number: 5,927,316

[45] Date of Patent: Jul. 27, 1999

[54] SAFETY CUT-OFF SYSTEM

[75] Inventor: Michael G. Merrill, Chester, N.J.

[73] Assignee: Suburban Propane, L.P., Whippany, N.J.

[21] Appl. No.: 08/924,588

[22] Filed: Sep. 5, 1997

[51] Int. Cl.[6] .......... F16K 17/40

[52] U.S. Cl. .......... 137/68.14; 137/68.18; 137/456

[58] Field of Search .......... 137/67, 68.11, 137/68.14, 68.18, 456

[56] References Cited

U.S. PATENT DOCUMENTS

| | | | |
|---|---|---|---|
| Re. 34,939 | 5/1995 | Sturgis . | |
| 1,284,197 | 11/1918 | Larner et al. | 137/68.14 |
| 2,399,843 | 5/1946 | Adams | 137/67 X |
| 2,531,958 | 11/1950 | Williams et al. | 137/68.11 |
| 3,388,746 | 6/1968 | Lindberg . | |
| 3,509,942 | 5/1970 | Lindberg . | |
| 3,704,718 | 12/1972 | Rudel . | |
| 3,721,898 | 3/1973 | Dragoumis et al. . | |
| 3,739,796 | 6/1973 | Jablansky | 137/68.14 X |
| 3,744,505 | 7/1973 | Huvey et al. | 137/68.14 |
| 4,098,438 | 7/1978 | Taylor . | |
| 4,267,853 | 5/1981 | Yamaguchi et al. . | |
| 4,377,210 | 3/1983 | Monte . | |
| 4,587,919 | 5/1986 | Loire et al. . | |
| 4,978,947 | 12/1990 | Finnegan . | |
| 5,054,523 | 10/1991 | Rink . | |
| 5,103,852 | 4/1992 | Jones et al. . | |
| 5,488,968 | 2/1996 | Price et al. . | |
| 5,577,706 | 11/1996 | King . | |
| 5,601,109 | 2/1997 | Muddiman . | |
| 5,640,990 | 6/1997 | Rodriguez | 137/68.18 |

OTHER PUBLICATIONS

Ronan Intrinsically Safe Barriers Installation Drawings (X57A25, Rev. 1) Date Unknown.

*Primary Examiner*—John Rivell
*Attorney, Agent, or Firm*—Klauber & Jackson

[57] ABSTRACT

A system for transferring a product from a source which includes a safety cut-off feature for preventing the transfer of the product. The system includes a tubular member adapted to handle the transfer of the product therethrough, a remote connector, a product connector, and an electric circuit. The tubular member has a proximal end, a distal end, and at least two separate conductive paths, including first and second conductive paths, each extending between the proximal and distal ends. The remote connector is attached to the distal end of the tubular member for conductively connecting the first and second conductive paths in series. The product connector supplies the tubular member with the product from the source and conductively connects to the second conductive path, whereby the product connector and the tubular member define a product transfer path. The electric circuit passes an electric current through a monitored electrical path which includes the first conductive path, the remote connector, the second conductive path, and the product connector, and terminates the transfer of the product in response to an interruption in the electric current. Preferably, at least one of the components may be releasably attached for easy reattachment after separation.

33 Claims, 5 Drawing Sheets

SAFETY CUT-OFF SYSTEM

FIELD OF THE INVENTION

The present invention relates to safety cut-off systems generally and, more particularly, but not by way of limitation, to a novel cut-off system for use with a product transfer apparatus.

BACKGROUND OF THE INVENTION

The present invention concerns systems having a cut-off, or shut-off, or shut-down feature. For example, the invention is applicable to product delivery systems at fixed facilities or on vehicles which deliver a product from a source, such as a tank, receptacle, or container. The product may be gaseous, liquid, solid, gel, or some combination thereof. By way of example, the product may be propane, gasoline, oil, or feed grain. Of great concern is the delivery of hazardous or combustible products which may pose safety, health or environmental threats, especially those associated with the risk of fire, explosion, implosion, toxicity, or other dangers.

Various regulations and guidelines address the concerns for safe transfer of potentially dangerous materials. For example, it has been established in 49 C.F.R. §178.337.11 (a)(i) that each internal self-closing stop valve and excess flow valve must automatically close if any of its attachments are sheared off or if any attached hoses or piping are separated.

It is also known that existing self-closing and excess flow valves experience difficulty automatically operating when container volume is low and pressures are low. Thus, reliance on these types of devices might not be warranted in a wide variety of operating conditions.

A principal object of the invention is to monitor the physical integrity of a product transfer system and enable automatic termination of the transfer process in the result of separation of piping, hose or attachment within the piping system, and in particular, complete separation thereof. Another object is to provide a system to detect piping or hose break on cargo vehicles or fixed facilities. A further object is to provide a product delivery system which is continuously monitored and which has a manual safety cut-off feature.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a particular embodiment, a system for transferring a product from a source, the system having a safety cut-off feature for preventing the transfer of the product, the system comprising a tubular member adapted to handle the transfer of the product therethrough, a remote connection means, product connection means, and an electric circuit means. The tubular member has a proximal end, a distal end, and at least two separate conductive paths, including first and second conductive paths, each extending between the proximal and distal ends. The remote connection means is attached to the distal end of the tubular member for conductively connecting the first and second conductive paths in series. The product connection means supplies the tubular member with the product from the source and conductively connects to the second conductive path, whereby the product connection means and the tubular member define a product transfer path. The electric circuit means passes an electric current through a monitored electrical path which includes the first conductive path, the remote connection means, the second conductive path, and the product connection means, and terminates the transfer of the product in response to an interruption in the electric current. The tubular member may be a flexible hose.

The tubular member is preferably releasably attached to the product connection means. The remote connection means is preferably releasably attached to the distal end of the tubular member.

The remote connection means may comprise an end fitting adapted to allow transfer of the product therethrough, wherein the end fitting further comprises a valve means for controlling the transfer of the product through the end fitting.

The system may include other valve means for controlling the transfer of the product through the product transfer path, wherein the valve means is capable of assuming a closed state in which transfer of the product therethrough is prevented, and an open state in which the product is allowed to be transferred therethrough.

The remote connection means may further comprise an end fitting attached to the distal end of the tubular member for connecting the first and second conductive paths in series. The end fitting may be releasably attached to the tubular member.

The product connection means may comprise an annular connector for releasable attachment, optionally releasable, to the proximal end of the tubular member, wherein the connector conductively connects to one of the conductive paths in the tubular member. In a particular embodiment, the annular connector comprises a tubular conduit adapted to slide into the tubular member, and an annular skirt extending circumferentially outwardly from the outer periphery of the tubular conduit, wherein the tubular conduit and the annular skirt are electrically conductive, wherein the annular skirt is capable of being crimped around the outer periphery of the proximal end of the tubular member in order to releasably interconnect the tubular member with the tubular conduit. The tubular conduit and the tubular member may be reattachable upon being separated by an external threshold load which causes the tubular member to slide out of engagement with the annular skirt.

The first conductive path thus may comprise at least one lead disposed proximate the proximal end of the tubular member, and the second conductive path may comprise at least one lead disposed proximate the proximal end of the tubular member, wherein the lead of the first conductive path passes through the annular skirt and is electrically insulated from the annular connector, and wherein the lead of the second conductive path is sandwiched between the annular connector and the outer or inner periphery of the tubular member when the tubular member engages the tubular body, wherein the lead of the second conductive path conductively contacts the annular connector, i.e. the tubular conduit or the skirt.

The annular skirt further preferably comprises an insulated interconnection means for connecting the lead of the first conductive path to the electric circuit means. The connection may be releasable.

The electrical circuit means may include an electrical power source for supplying the electric current to the first conductive path, a first relay means, and a second relay means. The first relay means has a positive energization terminal, a negative energization terminal connected to ground, an input common terminal connected to the electrical power source, and a deactivated output common terminal, wherein the output common terminal connects with the input common terminal when de-energized. The second relay means has a positive energization terminal, a negative energization terminal connected to ground, an input common terminal, a deactivated output common terminal, and an activated output common terminal, wherein the activated output common terminal connects with the input common terminal when energized, and wherein the deactivated output common terminal is connected to the input common terminal when de-energized, wherein the positive energization terminal of the first relay means is connected to the second conductive path, wherein the positive energization terminal of the second relay means is connected to the deactivated output common terminal of the first relay means, whereby the first relay means is energized when the system is intact, thereby de-energizing the second relay means, and whereby the first relay means is de-energized in the event of a break in continuity of the system, thereby energizing the second relay means, thereby diverting power from the activated output terminal to the activated output terminal.

The system may further comprise an intrinsically safe barrier or current barrier means for controlling the characteristics of the electrical current in the monitored electrical path in order to avoid sparking or ignition of the product.

The electrical power source may include a battery.

The system may also include at least one manual switch for manually interrupting the electric current. For example, the manual switch may be disposed proximate the remote connection means.

The product connection means is preferably electrically insulated from the source.

Furthermore, the product connection means may further comprise a flex connector adapted to handle the transfer of the product therethrough, and having a proximal end, a distal end, and at least one conductive path extending between the proximal and distal ends.

Furthermore, the present invention achieves the above objects, among others, by providing, in a particular embodiment, a safety system for transferring a product from a vehicle or fixed facility having a product container such as that found on a vehicle or as part of a fixed facility for holding the product, the system having a cut-off feature for stopping the transfer of the product from the container, the system comprising: a flexible hose adapted to handle the transfer of the product therethrough, the flexible hose having a proximal end, a distal end, and at least two conductive wires, including first and second conductive wires, each extending between the proximal and distal ends; a fill valve attached to the distal end of the flexible hose for controlling the dispensing of the product from the flexible hose and for conductively connecting the first and second conductive wires in series; at least one product delivery component for supplying the flexible hose with the product from the product container and for conductive connection to the second conductive wire, whereby the product delivery component and the flexible hose define a product transfer path; and an electric circuit means for passing an electric current through the first conductive wire, the fill valve, the second conductive wire, and the product delivery component, and for terminating the transfer of the product in response to an interruption in the electric current.

The flexible hose is preferably releasably attached to the product delivery component. The fill valve is preferably releasably attached to the distal end of the flexible hose.

The system may include a valve means disposed between the product container and the fill valve for controlling the transfer of the product through the product transfer path, wherein the valve means is capable of assuming a closed state in which transfer of the product therethrough is prevented, and an open state in which the product is allowed to be transferred therethrough.

The product connection means may further comprise an annular connector for releasable attachment to the proximal end of the flexible hose. The attachment may be releasable. The annular connector may include: a tubular conduit adapted to slide into the flexible hose, and an annular skirt extending circumferentially outwardly from the outer periphery of the tubular conduit. The tubular conduit and the annular skirt are electrically conductive. The annular skirt is capable of being crimped around the outer periphery of the proximal end of the flexible hose in order to interconnect the flexible hose with the tubular conduit. Furthermore, the tubular conduit and the flexible hose may be reattachable upon being separated by an external threshold load which causes the flexible hose to slide out of engagement with the annular skirt.

The first conductive wire further comprises at least one lead disposed proximate the proximal end of the flexible hose, and the second conductive wire further comprises at least one lead disposed proximate the proximal end of the flexible hose, wherein the lead of the first conductive wire passes through the annular skirt and is electrically insulated from the annular connector, and wherein the lead of the second conductive wire is sandwiched between the annular connector and the outer or inner periphery of the flexible hose when the flexible hose engages the tubular body, wherein the lead of the conductive wire conductively contacts the annular connector.

The annular skirt may further comprise an insulated interconnection means for releasably connecting the lead of the first conductive wire to the electric circuit means.

The electrical circuit means may include: an electrical power source for supplying the electric current to the first conductive wire, a first relay means, and a second relay means. The first relay means includes: a coil member having a positive energization terminal and a negative energization terminal connected to ground, and a switch member having an input common terminal connected to the electrical power source, and a deactivated output common terminal, wherein the output common terminal connects with the input common terminal when the coil member is de-energized. The second relay means includes: a coil member having a positive energization terminal and a negative energization terminal connected to ground, and a switch member having an input common terminal, a deactivated output common terminal, and an activated output common terminal, wherein the activated output common terminal is connected to the input common terminal when the coil is energized, and wherein the deactivated output common terminal is connected to the input common terminal when the coil member is de-energized. The positive energization terminal of the first relay means is connected to the second conductive wire, and the positive energization terminal of the second relay means is connected to the deactivated output common terminal of the first relay means. Thus, the first relay means is energized when the system is intact, thereby de-energizing the second relay means, and the first relay means is de-energized in the event of a break in continuity of the system, thereby energizing the second relay means, thereby supplying the deactivated output common terminal of the second relay means with electricity, thereby diverting power from the deactivated output terminal to the activated output terminal.

In a particular embodiment, the system may further comprise a motor means for powering the delivery of the product from the product container, the motor means including an ignition run circuit, wherein the second relay means is connected in series with the ignition run circuit, and wherein the second relay means completes the ignition run circuit when the system is intact, and wherein the second relay means shorts the ignition run circuit in response to an interruption in the electric current in the monitored electrical path.

The system may further comprise an auxiliary safety means such as a fire suppressant means for deterring fire in the vicinity of the system or other safety warning or shutdown means, wherein the second relay means activates, e.g., the fire suppressant means when energized.

The electric circuit means may further comprise an intrinsically safe barrier means or current barrier means for controlling the characteristics of the electrical current in the monitored electrical path in order to avoid sparking or ignition of the product. Furthermore, the system may comprise at least one manual switch attached to the fill valve for manually interrupting the electric current.

Preferably, the system is electrically insulated from the vehicle.

BRIEF DESCRIPTION OF THE DRAWINGS

Understanding of the present invention and the various aspects thereof will be facilitated by reference to the accompanying drawing figures, submitted for purposes of illustration only and not intended to limit the scope of the invention, in which.

DETAILED DESCRIPTION OF THE PREFERRED EMBODIMENTS

Figure 1:
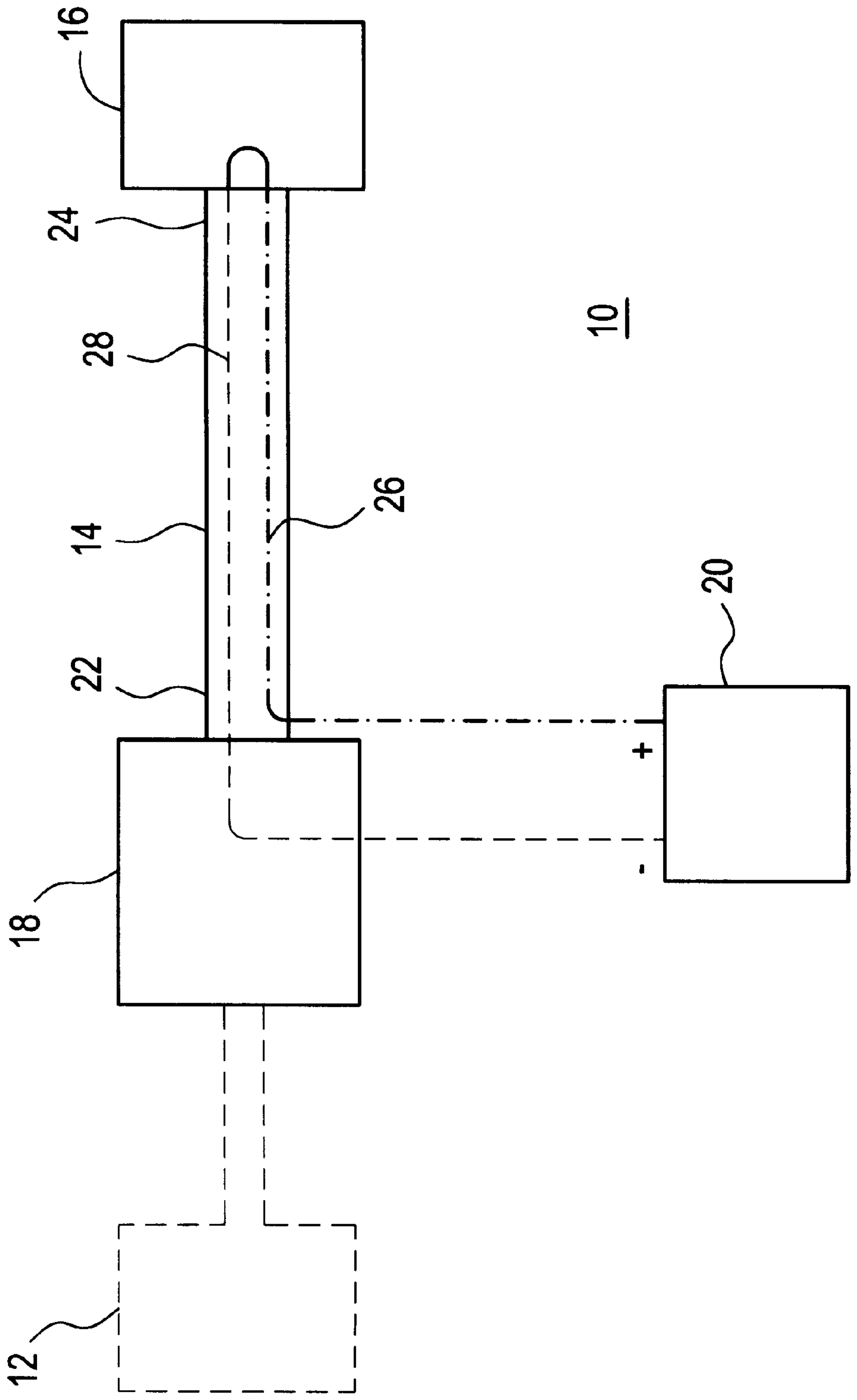
FIG. 1 is a schematic representation of a product transfer system with a safety shut-off feature, in accordance with the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may also be seen on other views.

FIG. 1 schematically illustrates the present invention relating to a system 10 for transferring a product from a source 12, where the source is shown in dashed lines. The system 10 has a safety shut-off feature for preventing the transfer of the product therethrough. The system 10 comprises a tubular member 14, a remote connection means 16, a product connection means 18, and an electric circuit means 20. The tubular member 14 is adapted to handle the transfer of the product therethrough. The tubular member 14 has a proximal end 22, a distal end 24, and two separate conductive paths, i.e. first and second conductive paths 26, 28, each extending between the proximal and distal ends 22, 24 of the tubular member 14.

The remote connection means 16 is attached to the distal end 24 of the tubular member 14 for conductively connecting the first and second conductive paths 26, 28 in series. Thus, the tubular member 14 is capable of conducting an electric current to the distal end 24 along a supply path, i.e. the first conductive path 26, and back along a return path, i.e. the second conductive path 28.

The product connection means 18 supplies the tubular member 14 with the product from the source 12 and conductively connects to the second conductive path 28, whereby the product connection means 18 and the tubular member 14 define at least part of a product transfer path.

The electric circuit means 20 passes an electric current through a monitored electrical path comprised of the first conductive path 26, the remote connection means 16, the second conductive path 28 and the product connection means 18. The electric circuit means 20 terminates the transfer of the product in response to an interruption in the electric current through the monitored electrical path.

Figure 2:
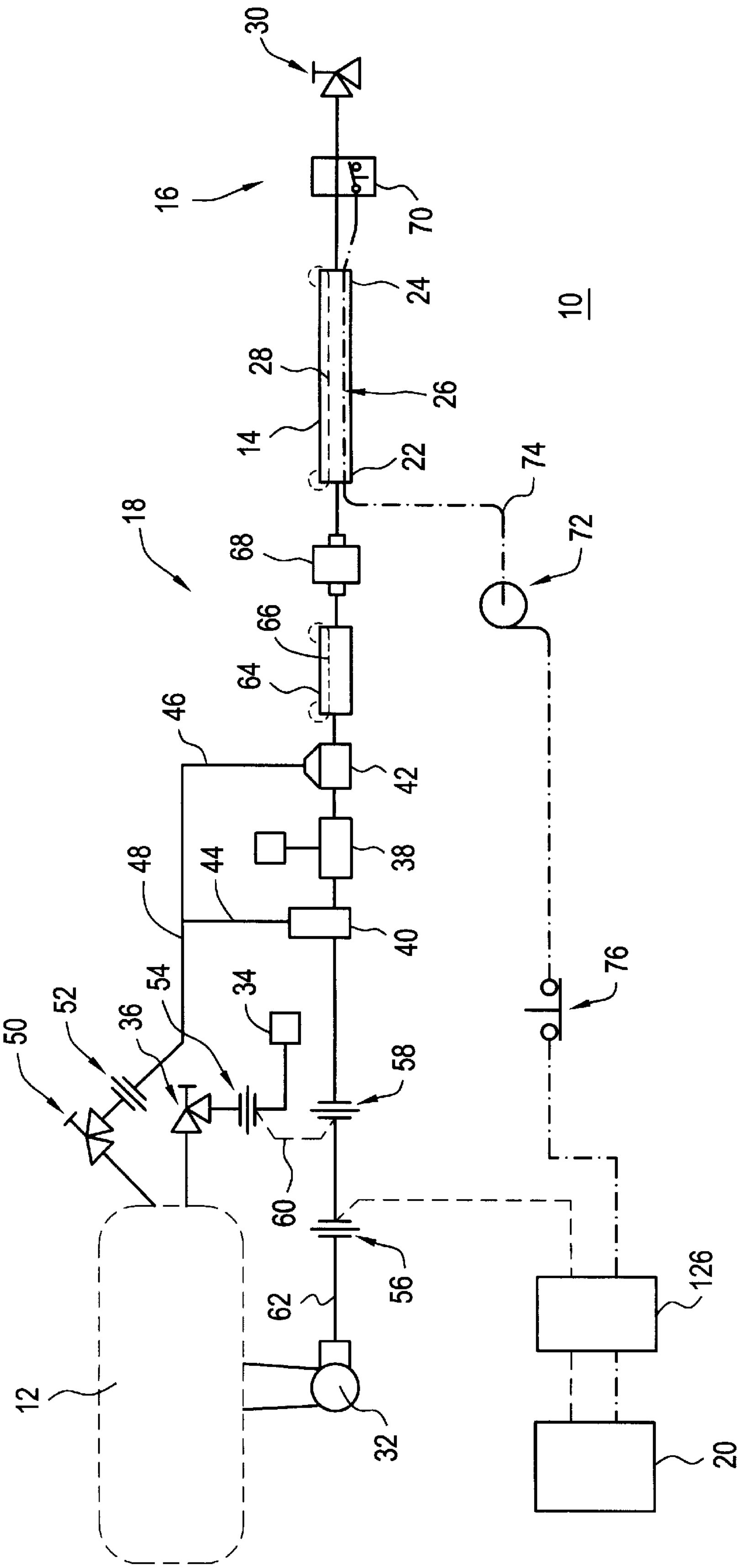
FIG. 2 is a schematic representation of an embodiment of the present invention.

FIG. 2 schematically shows an embodiment of the present invention in the form of a safety system 10 for transferring a product from a vehicle or fixed facility having a product container 12 for holding the product, the system 10 having a cut-off feature for stopping the transfer of the product from the container.

The system 10 comprises a flexible hose 14, a fill valve 30, a product connection means 18 comprised of at least one product delivery component, and an electrical circuit means 20.

The flexible hose 14 is adapted to handle the transfer of the product therethrough, the flexible hose 14 having a proximal end, a distal end, and at least two conductive wires, including first and second conductive wires 26, 28, each extending between the proximal and distal ends.

A hose and fill valve is attached to the distal end of the flexible hose 14 for controlling the dispensing of the product from the flexible hose 14 and for conductively connecting the first and second conductive wires in series.

FIG. 2 shows a plurality of product delivery components for supplying the flexible hose 14 with the product from the product container 12, and for conductively connecting to the second wire 28, whereby the product delivery components and the flexible hose 14 define a product transfer path. In general, the plurality of product delivery components forms part of the "return path" for the electric current returning from the second conductive wire 28 when electric current is supplied to the first conductive wire 26 and the system is intact. A pump or container outlet means 32 is attached to the product container 12. A pump bypass 34 and pump bypass nozzle and valve 36 provide a bypass return path for the product to the product container 12. The product is passed through a meter 38 having a vapor trap 40, and a differential valve 42 disposed upstream and downstream of the meter, respectively. The vapor trap 40, and differential valve 42 include vapor lines 44, 46 which are joined to a vapor line 48 leading from the product container 12 at a container vapor nozzle and valve 50. An insulated union 52 is provided in the joint vapor line, thereby electrically insulating the product transfer path from the container vapor nozzle and valve 50, the product container 12, and the rest of the vehicle. Similarly, an insulating union 54 is provided between the pump bypass 34 and the pump bypass nozzle and valve 36. Two insulated unions 56, 58 are interposed between the pump or container outlet means 32 and the juncture with the pump bypass 34 in series. A conductive link 60 between the insulated union 54 at the pump bypass connects with the piping 62 in the product transfer path between the two insulated unions 56, 58 in series downstream of the pump or container outlet means 32.

A flex connector 64 with one conductive path 66 is disposed downstream of the meter 38 and differential valve 42. A piping swivel 68 is provided between the flex connector 64 and the flexible hose 14. A single pole switch 70 in a weather tight enclosure provides a manual switch control over the current passing from the first conductive path 26 to the fill valve 30 and second conductive path 28. Thus a remote connection means 16 is comprised of the fill valve 30 and the single pole switch 70.

Thus, an electrical current which passes through the first conductive path 26 in the flexible hose 14 is transmitted through the single pole switch 70, the fill valve 30, the second conductive path 28 in the flexible hose 14, the piping swivel 68, the flex connector 64, the differential valve 42, the meter 38, the vapor trap 40, the pump bypass 34, and the various piping between these elements, as well as the isolated section of piping 62 between the two insulated unions 56, 58 downstream of the pump or container outlet means 32, so as to together form an electrical path which may be used to monitor the integral continuity of the physical interconnections therebetween. Product transfer piping, as used herein to include any flanges, tees, elbows, connectors, and equipment supports which help form the product transfer path, are electrically isolated from the vehicle container and chassis. The piping is at least partially conductive. One preferred embodiment includes metallic piping.

The system 10 is shown with a hose reel collector assembly 72, known to those skilled in the art, for managing the in-take and out-take of flexible tubing 14 which connects the electrical circuit means 20 with the first conductive path 26 in the flexible hose 14. Furthermore, a single pole switch 76 in a weather tight enclosure is provided between the electric circuit means 20 and the hose reel collector assembly 72, thereby providing a manual shut-down switch in that location. The electrical switch 76 shown in FIG. 2 is preferably housed in a weather tight enclosure. Furthermore, an intrinsic safe barrier 126 is provided between the electrical circuit means 20 and a single pole switch 76. That is, in particular embodiments, the system 10 may be specifically designed to control the emergency shut-down system on hazardous material transportation vehicles or fixed facilities. In the event of a loss of electrical continuity through the monitored electrical path running through the transfer piping and hose system, the shut-down system 10 will activate. Automatic shut-down will occur when an attachment, piping or hose is inadvertently sheared off or separated. Manual shut-down can occur when continuity is broken when an operator opens a single pole switch.

Figure 3:
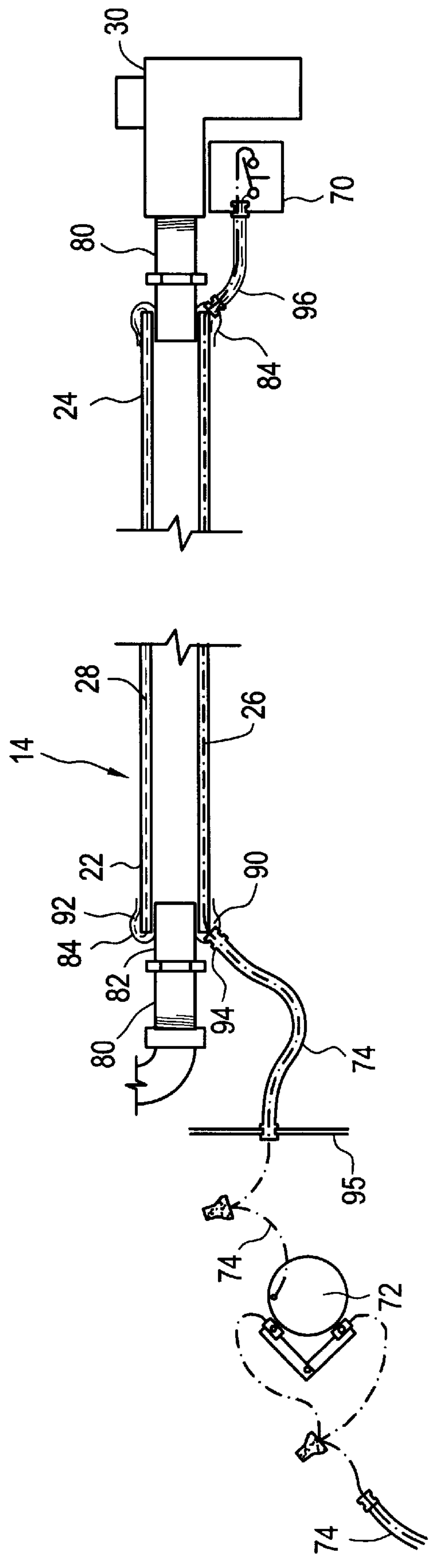
FIG. 3 is a side view of a portion of a product transfer path which includes a tubular member and a remote connection means, and showing a cutaway view of the tubular member, according to a particular embodiment of the present invention.

FIG. 3 shows a cutaway side view of the flexible hose 14 having the first and second conductive wires 26, 28 extending between the proximal 22 and distal 24 ends thereof. A hose end fitting or annular connector 80 is attached to the proximal end 22 of the flexible hose 14, wherein the connector 80 conductively connects to the second conductive path 28 in the flexible hose 14. The hose end fitting 80 comprises a tubular conduit 82 adapted to slide into the tubular member or flexible hose 14 through which the product may flow. An annular skirt 84 extending circumferentially outwardly from the outer periphery of the tubular conduit 82 is fixably attached to the tubular conduit. Both the tubular conduit 82 and the annual skirt 84 are each at least partially electrically conductive. The annular skirt 84 is crimped around the outer periphery of the proximal end 22 of the tubular member or flexible hose 14 in order to interconnect the tubular member 14 with the tubular conduit 82 of the annular connector 80.

As seen in FIG. 3, the first conductive path 26 includes at least one lead 90 disposed proximate the proximal end 22 of the flexible hose 14, and the second conductive path 28 further comprises at least one lead 92 disposed proximate the proximal end 22 of the flexible hose 14. The lead 90 of the first conductive path 26 passes through an opening in the annular skirt 84 and is electrically insulated therefrom. The lead 92 of the second conductive path 28 is sandwiched between the annular skirt 84 and the outer (or inner) periphery of the tubular member 14 when the tubular member 14 engages the tubular body or conduit 82, wherein the lead 92 of the second conductive path 28 conductively contacts the skirt 84 (or conduit 82). Thus, electrical current may pass through the second conductive path 28, the annular skirt 84, and the tubular conduit 82 of the annular connector 80.

Thus, the lead 90 at the proximal end 22 of the flexible hose 14 corresponding to the first conductive path or first conductive wire 26 is electrically insulated from the corresponding hose end fitting 80.

The electrical line 74 leading from the hose reel collector assembly 72 is preferably a weather tight flexible conduit. The hose reel collector assembly 72 is preferably housed in an enclosure 95, partially shown in FIG. 3.

Another hose end fitting or annular connector 80 is attached to the distal end 24 of the flexible hose 14, wherein the first conductive wire 26 is electrically insulated from the hose end fitting 80 and passes through an opening in the annular skirt 84 where it connects with a weather tight flexible conduit 96 leading to a switch enclosure. The switch enclosure houses a single pole switch 70. The hose end fitting 80 conductively connects to the second conductive wire 28 in the flexible hose 14.

Figure 4:
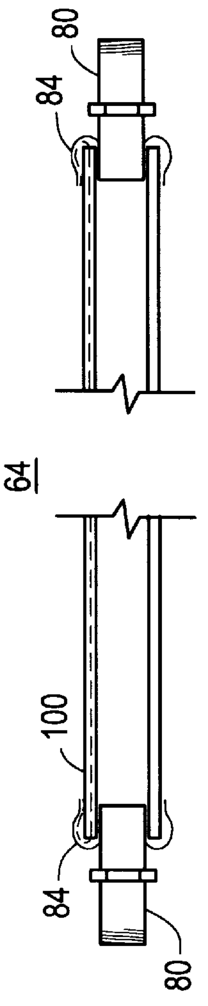
FIG. 4 is a side cutaway view of a flex connector provided with a conductive path, according to a particular embodiment of the present invention.

FIG. 4 shows a cutaway sideview of the flex connector 64. A pair of hose end fittings or annular connectors 80 are provided at each end thereof for conductively connecting the conductive wire 100 in the flex connector 64 upstream and downstream thereof.

Figure 5:
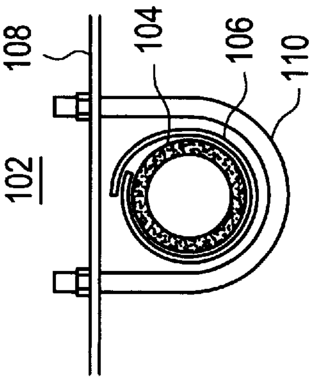
FIG. 5 is a cross-sectional cutaway view of a piping support isolation for electrically insulating the transfer piping, according to a particular embodiment of the present invention.

FIG. 5 shows an insulated piping support 102. A metallic product transfer piping 104 is wrapped in a nonconductive insulating material 106 and is retained with respect to the vehicle chassis 108 by a pipe support 110.

Figure 6:
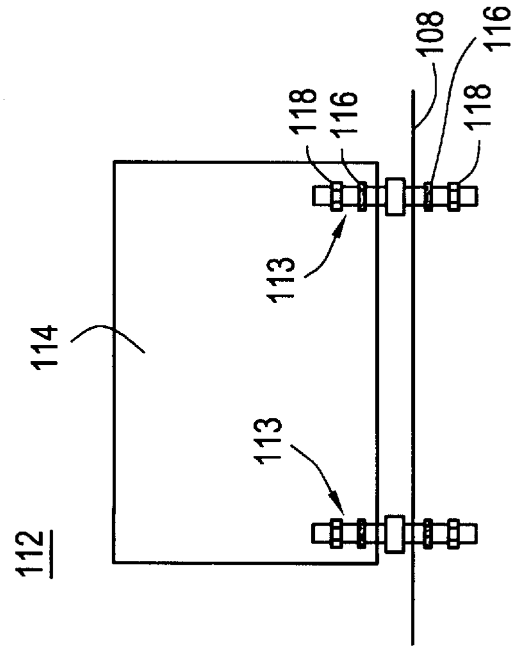
FIG. 6 is a schematic representation of an equipment support isolation for electrically insulating the transfer piping, according to a particular embodiment of the present invention.

FIG. 6 illustrates an insulated equipment support 112 which may be used to support and electrically insulate equipment such as the meter, hose reel, etc. Nonconductive insulating means 113 separates the equipment inside the enclosure 114 from the vehicle chassis 108, wherein mounting is accomplished by insulated washers 116 and mounting fasteners 118.

Figure 7:
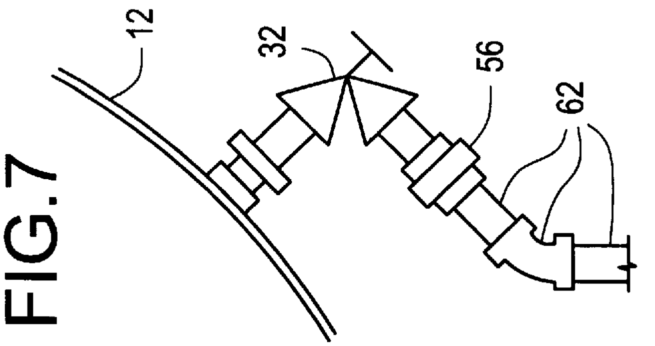
FIG. 7 is a schematic representation of a support isolation for electrically insulating the transfer piping, according to a particular embodiment of the present invention.

FIG. 7 illustrates an embodiment of the pump or container outlet means 32 disposed outside the product container 12, wherein an insulated union 56 electrically isolates the downstream metallic product transfer piping 62 from the container 12 and pump 32.

Figure 8:
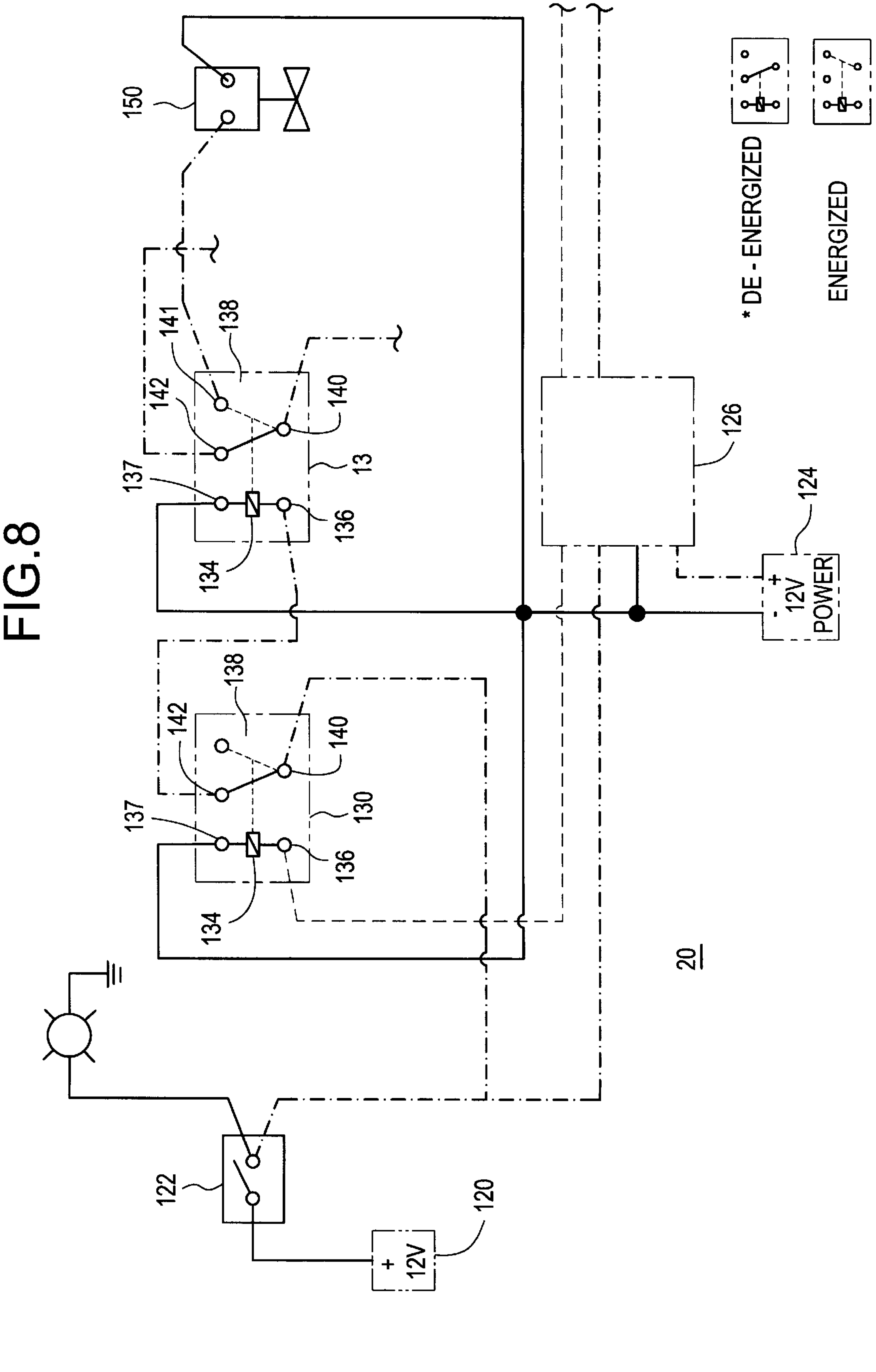
FIG. 8 is a schematic representation of an electric circuit means, according to a particular embodiment of the present invention.

FIG. 8 schematically illustrates an embodiment of the electric circuit means 20. The electric circuit means 20 may be of the NEMA type 1 enclosure when located within an area of nonhazardous classification.

One electrical power source may be a 12 volt DC power supply 120 originating from a side switch 122 from the Power Take Off (PTO) of the vehicle transmission. The PTO side switch 122 is utilized to provide power only when the PTO is engaged. For example, during transportation from plant to customers, the PTO is disengaged and the system 10 is non-operational. Alternatively, or in addition, the system may comprise a 12 volt battery source 124 as depicted in FIG. 7.

The one or more electrical power sources 120 and/or 124 supply current to an intrinsically safe barrier 126 for regulating the characteristics of the current so as to further supply a safe operating current which minimizes or eliminates the chances of sparking or ignition downstream of the intrinsically safe barrier 126. The intrinsically safe barrier 126 is known to the skilled artisan, and does not form a part of the invention herein. For example, an intrinsically safe barrier such as model no. X57A25 manufactured by Ronan Engineering of Woodland Hills, Calif., may be utilized.

Thus, the first conductive wire 26 in the flexible hose 14 is preferably provided with a source of regulated safe electric current.

FIG. 8 shows a first relay means 130 connected to a second relay means 132. The first relay means 130 includes a coil member 134 having a positive energization terminal 136 and a negative energization terminal 137 connected to ground, and a switch member 138 having an input common terminal 140 connected to the electrical power source 120 and/or 124, and a deactivated output common terminal 142, wherein the output common terminal 142 connects with the input common terminal 140 when the coil member 134 is de-energized.

The second relay means 132 includes a coil member 134 having a positive energization terminal 136 and a negative energization terminal 137 connected to the ground, and a switch member 138 having an input common terminal 140, an activated output common terminal 141, and a deactivated output common terminal 142, wherein the deactivated output common terminal 142 is connected to the input common terminal 140 when the coil 134 is de-energized, and wherein the activated output common terminal 141 is connected to the input common terminal 140 when the coil member 134 is energized. The positive energization terminal 136 of the first relay means 130 is connected to the electric current return path associated with second conductive path or wire 28. The positive energization terminal 136 of the second relay means 132 is connected to the deactivated output common terminal 142 of the first relay means 130. Thus, the first relay means 130 is energized when the system 10 is intact, thereby de-energizing the second relay means 132, thereby supplying the deactivated output common terminal 142 of the second relay means 132 with electricity. The first relay means 130 is de-energized in the event of a break in continuity of the system 10, thereby energizing the second relay means 132, thereby diverting power from the deactivated output terminal 142 to the activated output terminal 141 of the second relay means 132.

In the event that the system comprises a motor means for powering the delivery of the product from the product container, wherein the motor means includes an ignition run circuit, the second relay means 132 may be connected in series with the ignition run circuit, wherein the second relay means 132 completes the ignition circuit when the system 10 is intact, and where the second relay means 132 shorts out the ignition run circuit in response to an interruption in the electric circuit in the monitored electrical path. That is, the input common terminal 140 of the second relay means 132 and the de-energized output common terminal 142 thereof form part of the ignition run circuit when the first relay means 130, is energized, the second relay means 132 is de-energized, and wherein the second relay means 132 interrupts the ignition run circuit when energized. Optionally, emergency equipment may be energized at the same time that the vehicle engine or motor is shut-down. For example, the system 10 may further comprise, or be connected to an auxiliary safety means, such as a fire suppressant means for deterring fire in the vicinity of the system or other safety warning on shutdown equipment. It is then possible for the second relay means 132 to activate the fire suppressant means when energized, as for example, through an optional solenoid valve 150 which is normally closed. Preferably the system is electricily isolated, e.g. the system is electrically insulated from the vehicle or fixed facility on which it may be disposed.

It should be understood that the present invention may be used on movable units such as motorized vehicles or unpowered trailers, or on stationary locations, such as fill tanks or silos. Furthermore, the present invention may be utilized with hazardous as well as with nonhazardous products or materials. These examples are illustrative only and are meant in no way to limit the applications to which the present invention may be applied.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

What is claimed is:

1. A system for transferring a product from a source, said system having a safety cut-off feature for preventing the transfer of the product, said system comprising:

a tubular member adapted to handle the transfer of the product therethrough, said tubular member having a proximal end, a distal end, and at least two separate conductive paths, including first and second conductive paths, each extending between said proximal and distal ends;

a remote connection means attached to the distal end of said tubular member for conductively connecting said first and second conductive paths in series;

product connection means for supplying said tubular member with the product from the source and for conductive connection to said second conductive path, whereby said product connection means and said tubular member define a product transfer path; and an electric circuit means for passing an electric current through a monitored electrical path which includes said first conductive path, said remote connection means, said second conductive path, and said product connection means, and for terminating the transfer of the product in response to an interruption in the electric current.

2. The system according to claim 1 wherein said tubular member is a flexible hose.

3. The system according to claim 1 wherein said tubular member is releasably attached to said product connection means.

4. The system according to claim 1 wherein said remote connection means is releasably attached to the distal end of said tubular member.

5. The system according to claim 1 wherein said remote connection means further comprises an end fitting adapted to allow transfer of the product therethrough.

6. The system according to claim 5 wherein said end fitting further comprises a valve means for controlling the transfer of the product through said end fitting.

7. The system according to claim 1 further comprising a valve means for controlling the transfer of the product through said product transfer path, wherein said valve means is capable of assuming a closed state in which transfer of the product therethrough is prevented, and an open state in which the product is allowed to be transferred therethrough.

8. The system according to claim 1 wherein said remote connection means further comprises an end fitting attached to the distal end of said tubular member for connecting said first and second conductive paths in series.

9. The system according to claim 1 wherein said product connection means further comprises an annular connector for attachment to said proximal end of said tubular member, wherein said connector conductively connects to one of said conductive paths in said tubular member.

10. The system according to claim 9 wherein said annular connector further comprises:

a tubular conduit adapted to slide into said tubular member; and an annular skirt extending circumferentially outwardly from the outer periphery of said tubular conduit;

wherein said tubular conduit and said annular skirt are electrically conductive; and wherein said annular skirt is capable of being crimped around the outer periphery of said proximal end of said tubular member in order to releasably interconnect said tubular member with said tubular conduit.

11. The system according to claim 10 wherein said first conductive path further comprises at least one lead disposed proximate said proximal end of said tubular member;

wherein said second conductive path further comprises at least one lead disposed proximate said proximal end of said tubular member;

wherein said lead of said first conductive path passes through said annular skirt and is electrically insulated from said annular connector; and wherein said lead of said second conductive path is sandwiched between said annular connector and said tubular member when said tubular member engages said tubular body, wherein said lead of said second conductive path conductively contacts said annular connector.

12. The system according to claim 11 wherein said annular skirt further comprises an insulated interconnection means for connecting said lead of said first conductive path to said electric circuit means.

13. The system according to claim 1 wherein said electrical circuit means includes:

an electrical power source for supplying the electric current to said first conductive path;

a first relay means having a positive energization terminal, a negative energization terminal connected to ground, an input common terminal connected to said electrical power source, and a deactivated output common terminal, wherein said output common terminal connects with said input common terminal when de-energized;

a second relay means having a positive energization terminal, a negative energization terminal connected to ground, an input common terminal, a deactivated output common terminal, and an activated output common terminal, wherein said activated output common terminal connects with said input common terminal when energized, and wherein said deactivated output common terminal is connected to said input common terminal when de-energized;

wherein said positive energization terminal of said first relay means is connected to said second conductive path;

wherein said positive energization terminal of said second relay means is connected to said deactivated output common terminal of said first relay means;

whereby said first relay means is energized when said system is intact, thereby de-energizing said second relay means;

whereby said first relay means is de-energized in the event of a break in continuity of said system, thereby energizing said second relay means, thereby diverting power from said deactivated output terminal to said activated output terminal.

14. The system according to claim 13 further comprising an intrinsically safe current barrier means for controlling the characteristics of the electrical current in the monitored electrical path in order to avoid sparking or ignition of the product.

15. The system according to claim 13 wherein said electrical power source comprises a battery.

16. The system according to claim 1 further comprising at least one manual switch for manually interrupting the electric current.

17. The system according to claim 16 wherein said manual switch is disposed proximate said remote connection means.

18. The system according to claim 16 wherein said product connection means is electrically insulated from said source.

19. The system according to claim 1 wherein said product connection means further comprises a flex connector adapted to handle the transfer of the product therethrough, and having a proximal end, a distal end, and at least one conductive path extending between the proximal and distal ends.

20. A safety system for transferring a product from a vehicle having a product container for holding the product, said system having a cut-off feature for stopping the transfer of the product from the product container, said system comprising:

a flexible hose adapted to handle the transfer of the product therethrough, said flexible hose having a proximal end, a distal end, and at least two conductive wires, including first and second conductive wires, each extending between said proximal and distal ends;

a fill valve attached to the distal end of said flexible hose for controlling the dispensing of the product from said flexible hose and for conductively connecting said first and second conductive wires in series;

at least one product delivery component for supplying said flexible hose with the product from the product container and for conductive connection to said second conductive wire, whereby said product delivery component and said flexible hose define a product transfer path; and an electric circuit means for passing an electric current through said first conductive wire, said fill valve, said second conductive wire, and said product delivery component, and for terminating the transfer of the product in response to an interruption in the electric current.

21. The system according to claim 20 wherein said flexible hose is releasably attached to said product delivery component.

22. The system according to claim 20 wherein said fill valve is releasably attached to the distal end of said flexible hose.

23. The system according to claim 20 further comprising a valve means disposed between said product container and said fill valve for controlling the transfer of the product through said product transfer path, wherein said valve means is capable of assuming a closed state in which transfer of the product therethrough is prevented, and an open state in which the product is allowed to be transferred therethrough.

24. The system according to claim 20 wherein said product connection means further comprises an annular connector attached to said proximal end of said flexible hose.

25. The system according to claim 24 wherein said annular connector further comprises:

a tubular conduit adapted to slide into said flexible hose; and an annular skirt extending circumferentially outwardly from the outer periphery of said tubular conduit;

wherein said tubular conduit and said annular skirt are electrically conductive; and wherein said annular skirt is capable of being crimped around the outer periphery of said proximal end of said flexible hose in order to interconnect said flexible hose with said tubular conduit.

26. The system according to claim 25 wherein said first conductive wire further comprises at least one lead disposed proximate said proximal end of said flexible hose;

wherein said second conductive wire further comprises at least one lead disposed proximate said proximal end of said flexible hose;

wherein said lead of said first conductive wire passes through said annular skirt and is electrically insulated from said annular connector; and wherein said lead of said second conductive wire is sandwiched between said annular connector and said flexible hose when said flexible hose engages said tubular body, wherein said lead of said conductive wire conductively contacts said annular connector.

27. The system according to claim 26 wherein said annular skirt further comprises an insulated interconnection means for connecting said lead of said first conductive wire to said electric circuit means.

28. The system according to claim 20 wherein said electrical circuit means includes:

an electrical power source for supplying the electric current to said first conductive wire;

a first relay means including:

a coil member having a positive energization terminal and a negative energization terminal connected to ground; and a switch member having an input common terminal connected to said electrical power source, and a deactivated output common terminal, wherein said output common terminal connects with said input common terminal when said coil member is de-energized;

a second relay means including:

a coil member having a positive energization terminal and a negative energization terminal connected to ground; and a switch member having:

an input common terminal, a deactivated output common terminal, and an activated output common terminal, wherein said activated output common terminal is connected to said input common terminal when said coil is energized, and wherein said deactivated output common terminal is connected to said input common terminal when said coil member is de-energized;

wherein said positive energization terminal of said first relay means is connected to said second conductive wire;

wherein said positive energization terminal of said second relay means is connected to said deactivated output common terminal of said first relay means;

whereby said first relay means is energized when said system is intact, thereby de-energizing said second relay means, whereby said first relay means is de-energized in the event of a break in continuity of said system, thereby energizing said second relay means, thereby supplying said activated output common terminal of said second relay means with electricity, thereby diverting power from said deactivated output terminal to said activated output terminal.

29. The system according to claim 28 wherein said system further comprises a motor means for powering the delivery of the product from the product container, said motor means including an ignition run circuit, wherein said second relay means is connected in series with said ignition run circuit, and wherein said second relay means completes said ignition run circuit when said system is intact, and wherein said second relay means shorts said ignition run circuit in response to an interruption in the electric current in the monitored electrical path.

30. The system according to claim 29 further comprising an auxiliary safety means activated by said second relay means when energized.

31. The system according to claim 20 wherein said electric circuit means further comprises a current barrier means for controlling the characteristics of the electrical current in the monitored electrical path in order to avoid sparking or ignition of the product.

32. The system according to claim 20 further comprising at least one manual switch attached to said fill valve for manually interrupting the electric current.

33. The system according to claim 20 wherein said system is electrically isolated.

* * * * *